United States Patent [19]
Swindler et al.

[11] Patent Number: 6,041,650
[45] Date of Patent: Mar. 28, 2000

[54] LIQUID LEVEL GAUGE

[75] Inventors: Danny E. Swindler, Round Rock; Amber N. Dudley, Austin; Herbert G. Ross, Jr., Argyle, all of Tex.

[73] Assignee: Rochester Gauges, Inc., Dallas, Tex.

[21] Appl. No.: 08/918,951

[22] Filed: Aug. 26, 1997

[51] Int. Cl.$^7$ .................................................. G01F 23/38
[52] U.S. Cl. ........................... 73/317; 73/305; 73/DIG. 5; 116/229
[58] Field of Search ....................... 73/305, 317, DIG. 5; 116/229

[56] References Cited

U.S. PATENT DOCUMENTS

| | | | |
|---|---|---|---|
| 1,141,499 | 6/1915 | Stahle | 73/317 |
| 1,448,842 | 3/1923 | Gregory | 73/317 |
| 1,937,231 | 11/1933 | Klein | 73/317 |
| 2,311,387 | 2/1943 | Hastings | 73/317 |
| 2,578,104 | 12/1951 | Taylor | 73/305 X |
| 2,584,446 | 2/1952 | Hastings et al. | 73/317 |
| 4,532,491 | 7/1985 | Rau et al. | 73/317 X |

*Primary Examiner*—Hezron Williams
*Assistant Examiner*—Willie Morris Worth
*Attorney, Agent, or Firm*—Sidley & Austin

[57] ABSTRACT

A float-type liquid level gauge is provided for measuring the level within a tank of liquids such as liquified petroleum gases. The liquid level gauge includes a movable float arm (30) coupled by gears (46, 48) to a magnet shaft (26) and magnet (28) mounted in a rigid support arm (24) through a side-accessible shaft passage (110). The support arm is connected to the lower side of a gauge head (22) and the magnet extends into a passage (52) in the gauge head so as to be magnetically coupled to a level indicating dial (34) provided on the upper side of the gauge head.

21 Claims, 10 Drawing Sheets

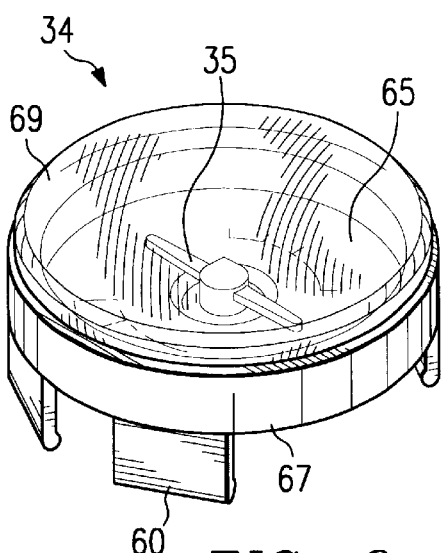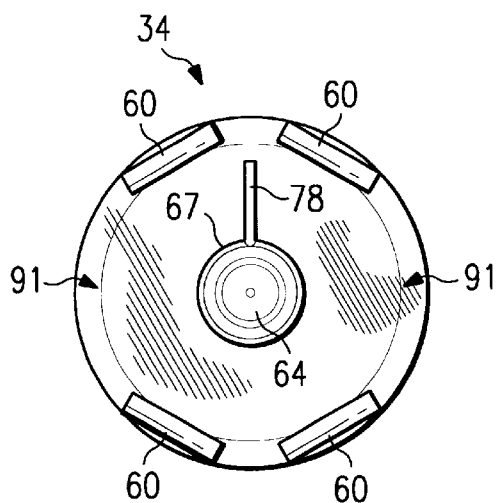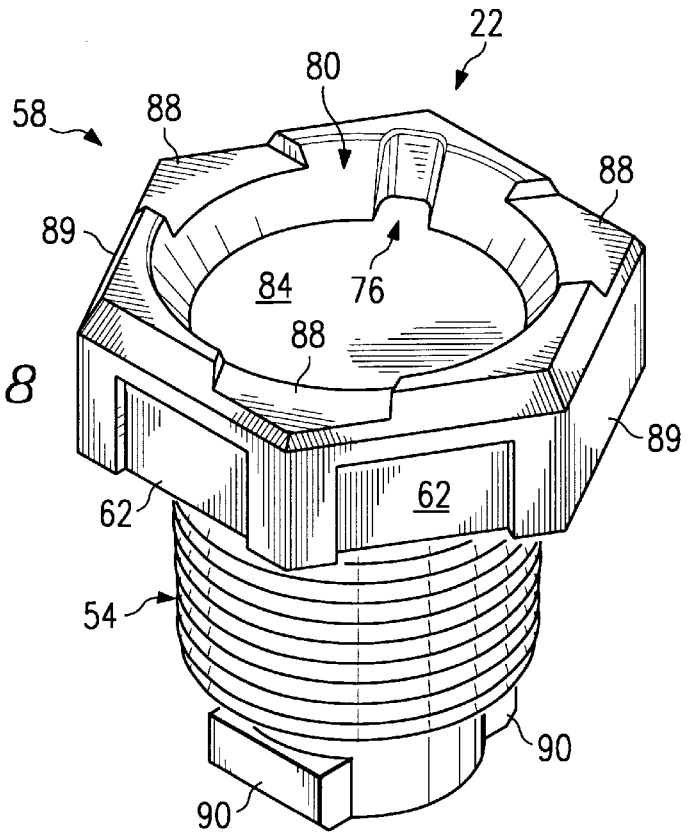

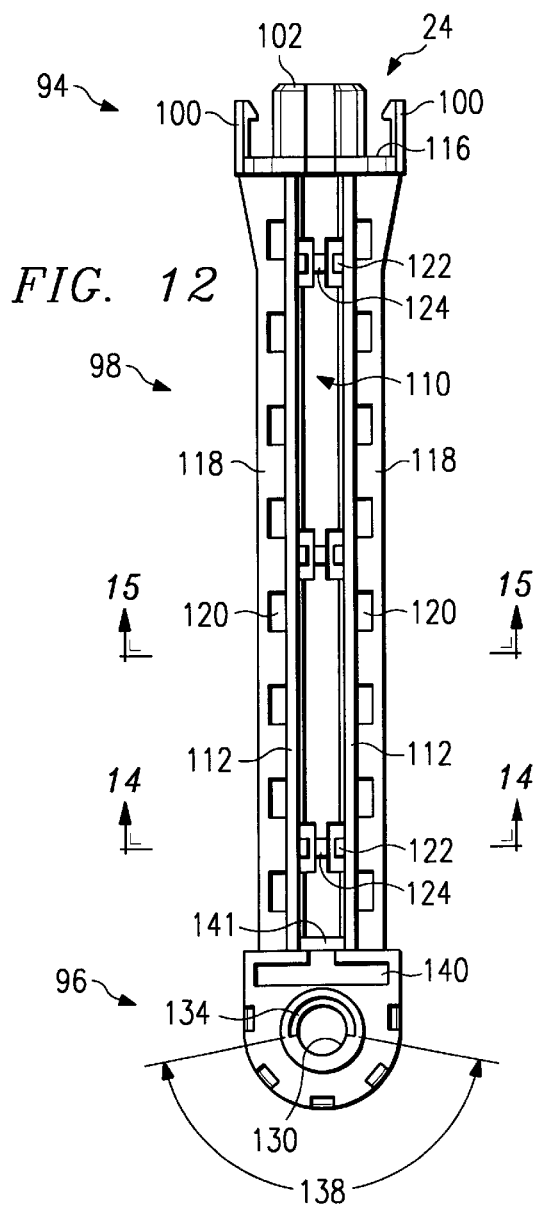
FIG. 12
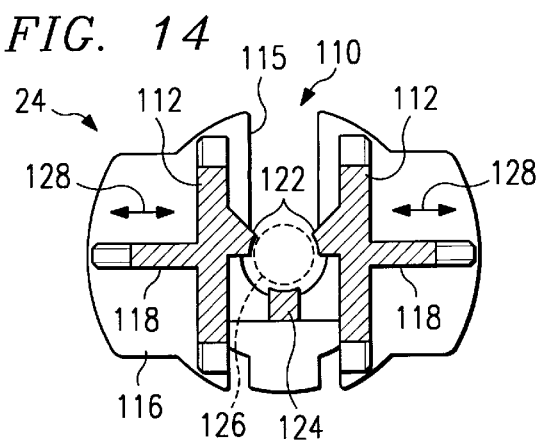
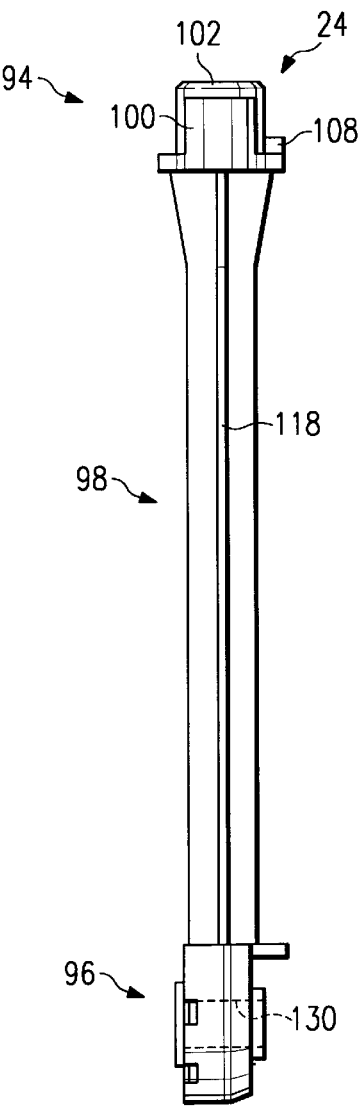
FIG. 13
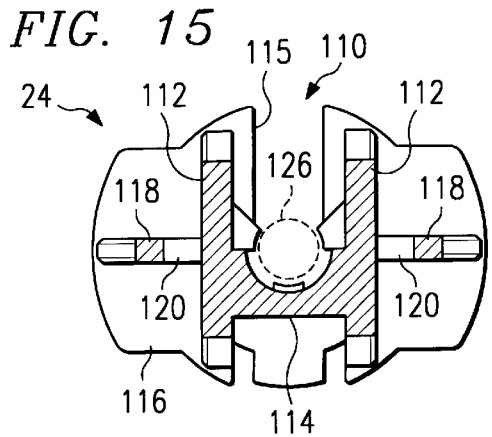
FIG. 14    FIG. 15

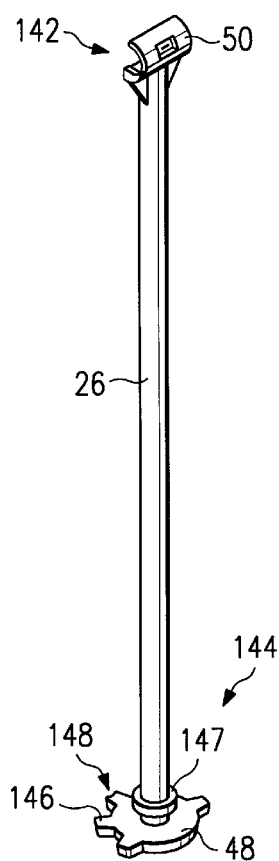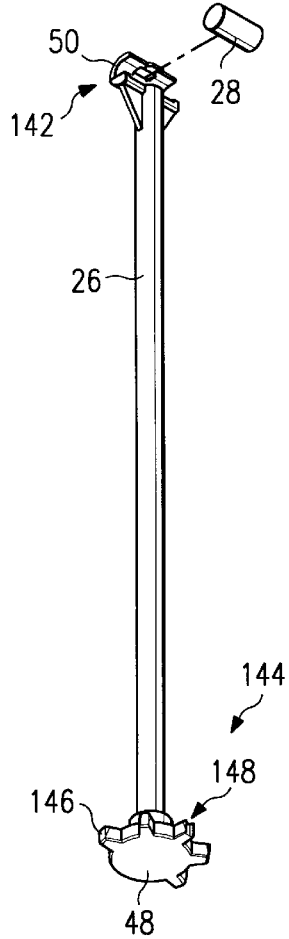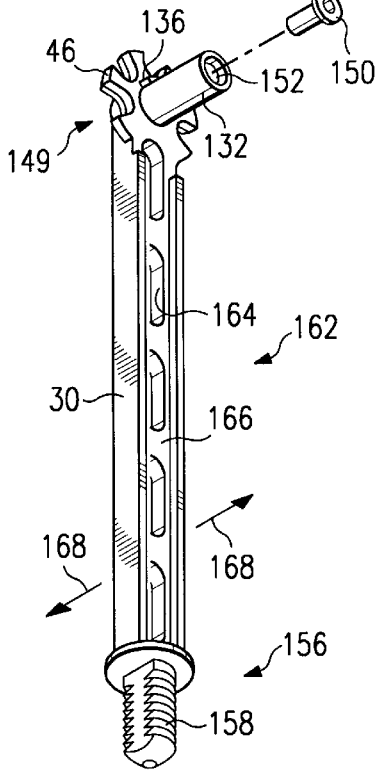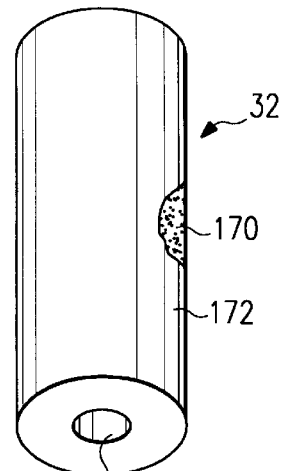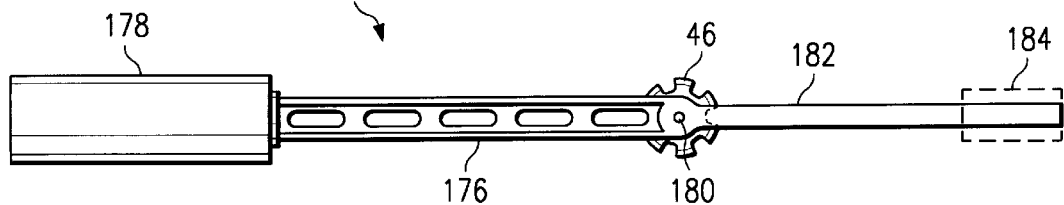

6,041,650

LIQUID LEVEL GAUGE

TECHNICAL FIELD OF THE INVENTION

This invention relates to gauges for measuring the level of liquid in a tank. In one aspect, it relates to a float-type liquid level gauge for measuring the level of liquid in a pressurized tank containing a liquified petroleum gas.

BACKGROUND OF THE INVENTION

Liquids of the liquified petroleum gas type, such as propane, butane, and the like (often referred to generally as LPG), are commonly used for purposes such as residential or industrial heating, or for powering internal combustion engines on industrial vehicles such as lift trucks (i.e, fork lifts). The LPG is typically stored as a liquid under pressure in a pressurized tank or cylinder. A liquid level gauge may be provided on the tank for measuring the level of the liquid in the tank. In some applications such as lift trucks, the LPG cylinders are oriented horizontally while in use on the vehicle but are stored vertically when removed for refueling. In such applications, a liquid level gauge which can measure liquid levels in both orientations is desirable.

Liquid level gauges for measuring the level of a liquid such as LPG inside a pressurized tank are disclosed in U.S. Pat. Nos. 2,992,560 and 3,688,795. These patents disclose float-type liquid level gauges that utilize a pivoting float arm having a position which is responsive to the liquid level inside the tank. The float arm is connected to a rotatable shaft by means of a geared mechanism, and the shaft is magnetically coupled to an external liquid level indicator. A change in liquid level causes the float arm to rotate the shaft, and the magnetic coupling then rotates the external indicator without requiring a direct physical connection. Thus, the possibility of volatile liquid or vapor leaking through the mechanism is eliminated.

While useful, the previously disclosed float-type gauges have several drawbacks. First, due to the low density of LPG, the heavy-walled hollow float used to resist the pressure in the tank has insufficient buoyancy to float without a counterweight to balance the float arm. Such counterweights are typically discrete components which add to the manufacture and assembly expense of the gauge, and their size often increases the difficulty in installing the gauge through the narrow opening of the tank or cylinder. For example, on many lift truck cylinders and tanks for recreational vehicles (RVs), the in-tank parts of the level gauge must fit through a ¾" opening. A need therefore exists, for a liquid level gauge which does not require a counterweight, or where the counterweight is a small, integral part of another component.

Further, the design of previously disclosed float type gauges required the use of a large number of small discrete secondary components, such as gears, axles, bearings, and fasteners, in addition to the primary components, such as gauge head, support arm, drive shaft, magnet, float arm, and float. These discrete secondary components greatly increase the complexity of previously disclosed float type gauges and the expenses associated with the design, production and stocking of these typically small components increased the cost of the finished gauge. A need therefore exists, for a liquid level gauge which does not require a significant number of discrete secondary components.

Similarly, the complex design of previously disclosed float type gauges necessitates the use of skilled workers for their assembly. For example, the previously disclosed tubular support arms required that the magnet drive shaft be inserted through the end of the support arm and held in position by a discrete bearings or end caps which were themselves installed within or onto the support arm as one or more separate assembly operations. The large number of separate assembly operations and the need for skilled workers to perform these operations increases the cost of the finished gauge. A need therefore exists, for a liquid level gauge which does not require skilled workers for assembly and minimizes the number of separate assembly operations.

SUMMARY OF THE INVENTION

It is a particularly important object of this invention to provide a new and improved float-type liquid level gauge. It is a another object of the invention to provide a float type liquid level gauge requiring few discrete secondary components for its construction. It is a further object of the invention to provide a liquid level gauge comprising components which are easy to assemble to one another.

In accordance with one aspect of the current invention, a liquid level gauge is provided having a float arm which is pivotally connected to a lower end of a support arm and a gauge head which is connected to the upper end of the support arm. A magnet drive shaft is mounted in the support arm so as to engage the float arm at the lower end by means of a geared mechanism, and extending beyond the second end of the support arm into a passage on the underside of the gauge head. A magnet is attached to the end of the drive shaft inside the gauge head. Motion of the float arm imparts motion to the drive shaft via the geared mechanism, and the motion of the magnet attached to the drive shaft will cause the corresponding movement of a level indicating pointer on a magnetically coupled indicator dial. In another aspect of the current invention, the support arm has a side-accessible shaft passage for positioning the drive shaft. In another aspect of the current invention, the support arm is a one-piece assembly. In another aspect of the current invention, the drive shaft is a one-piece assembly including integral magnetic holder and integral shaft gear. In another aspect of the current invention, the float arm is a one-piece assembly including an integral float gear. In an alternative embodiment of the current invention, the separate float and float arm are replaced by a single float-and-arm member. In yet another aspect of the current invention, the float-and-arm member may have an integral counterweight.

In accordance with another aspect of the present invention, a liquid level gauge is provided consisting of only eight components, namely, a one-piece gauge head, a one-piece support arm, a one-piece magnet drive shaft, a one-piece float arm, a float arm fastener, a float, a magnet, and a magnetically coupled indicator dial assembly. In yet another aspect of the current invention, a liquid level gauge is provided consisting of only six components, namely, a one-piece gauge head, a one-piece support arm, a one-piece magnet drive shaft, a one-piece float-and-arm member, a magnet, and a magnetically coupled indicator dial assembly.

BRIEF DESCRIPTION OF THE DRAWINGS

A more complete understanding of the invention and its advantages will be apparent from the following detailed description when taken in conjunction with the accompanying drawings in which:

FIG. 2b is the top view of the indicator dial of the liquid level gauge when the float is in the position shown in FIG. 2a;

FIG. 3b is the top view of the indicator dial of the liquid level gauge when the float arm is in the position shown in FIG. 3a;

FIG. 4b is a top view of the indicator dial of the liquid level gauge when the float arm is shown in the position shown in FIG. 4a;

FIG. 5b is a top view of the indicator dial of the liquid level gauge when the float arm is in the position shown in FIG. 5a;

FIG. 6 is a perspective view of a preferred embodiment of the indicating dial assembly of the current invention;

FIG. 7 is a bottom view of the indicating dial assembly of FIG. 6;

FIG. 8 is a perspective view of a preferred embodiment of the gauge head of the current invention;

FIG. 12 is a front view of the support arm of FIGS. 11a and 11b;

FIG. 13 is a side view of the support arm;

FIG. 14 is a cross-sectional view of the support arm taken along line 14—14 of FIG. 12 through the drive shaft retainers and bearings;

FIG. 15 is a cross-sectional view of the support arm taken along line 15—15 of FIG. 12;

FIGS. 16a and 16b are perspective views of a preferred embodiment of the magnet drive shaft of the current invention;

FIG. 17a is a perspective view of a preferred embodiment of a float arm of the current invention;

FIG. 17b is a partial perspective view, similar to FIG. 17a, of the float arm having an alternative attachment member;

FIG. 18 is a perspective view of a preferred embodiment of a float member of the current invention; and FIG. 19 is an alternative one-piece float-and-arm member.

DETAILED DESCRIPTION

Figure 1A:
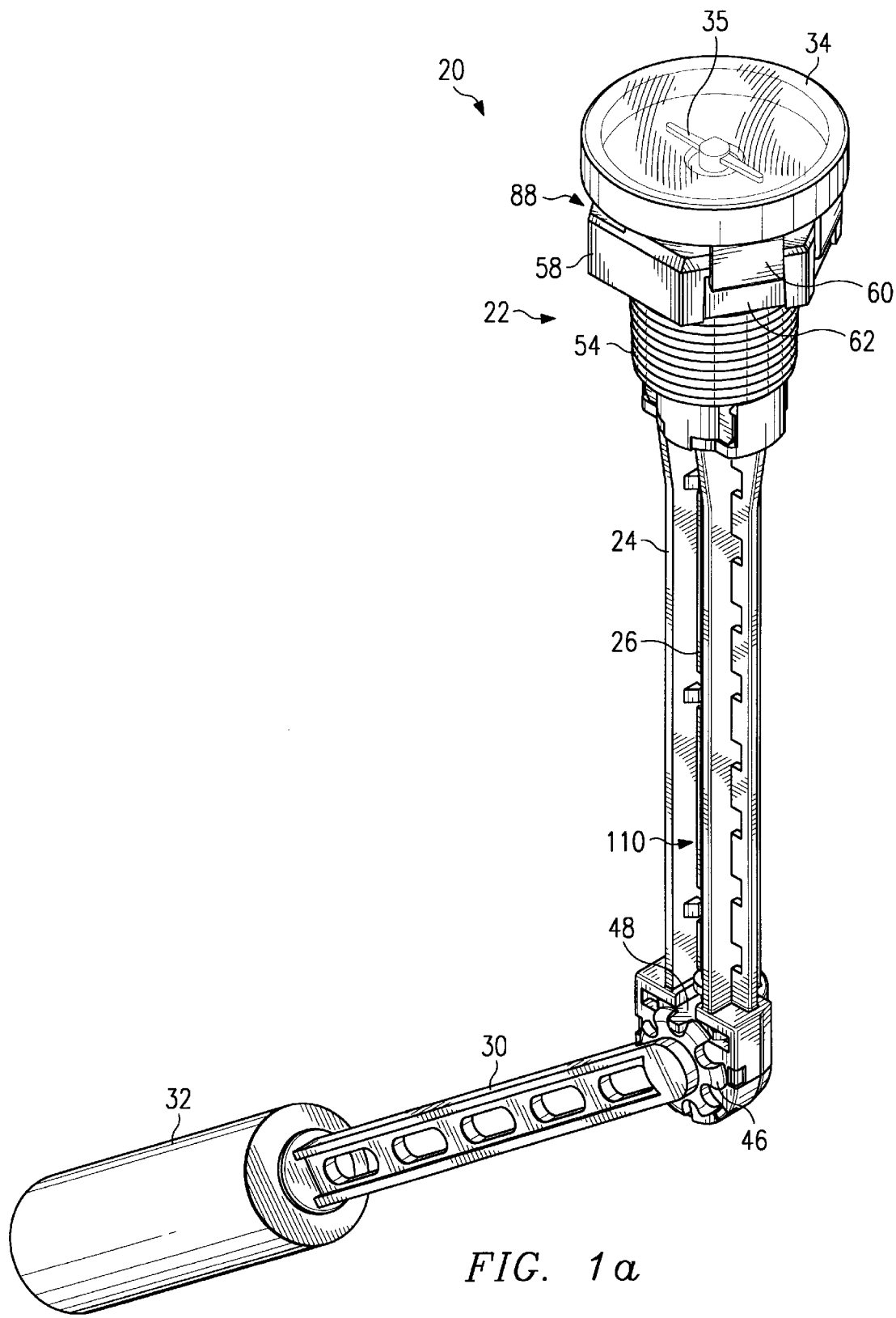
FIG. 1a is a perspective view of a preferred embodiment of the liquid level gauge.

Referring now to the drawings wherein like referenced characters designate like or corresponding parts throughout several views, a preferred embodiment of the liquid level gauge of the present invention is illustrated. Referring first to FIG. 1a, liquid level gauge 20 comprises a gauge head 22 and a support arm 24 attached to and projecting away from the gauge head 22. A magnet drive shaft 26 (best shown in FIG. 1b and FIGS. 16a and 16b) is installed in the support arm 24 so as to allow rotational movement. A magnet 28 (best shown in FIG. 1b and FIG. 16b) is attached to the upper end of the drive shaft 26. A float arm 30 is pivotally attached to the support arm 24, and a float 32 is attached to the float arm 30. A magnetically coupled indicating dial assembly 34 is mounted on the gauge head 22. Indicating dial assembly 34 includes a pointer 35 or other visual indicator of the level being measured.

Figure 1C:
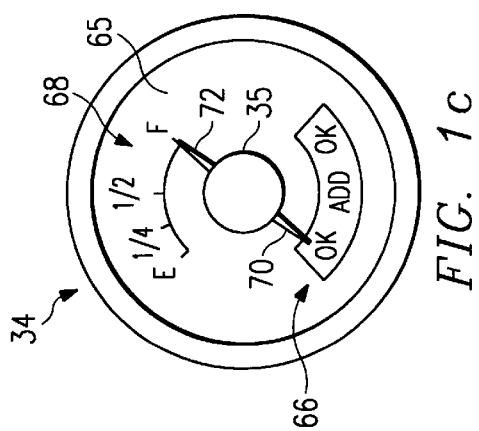
FIG. 1c is a top view of the indicator dial of the liquid level gauge when the float is in the position shown in FIG. 1b.
Figure 1B:
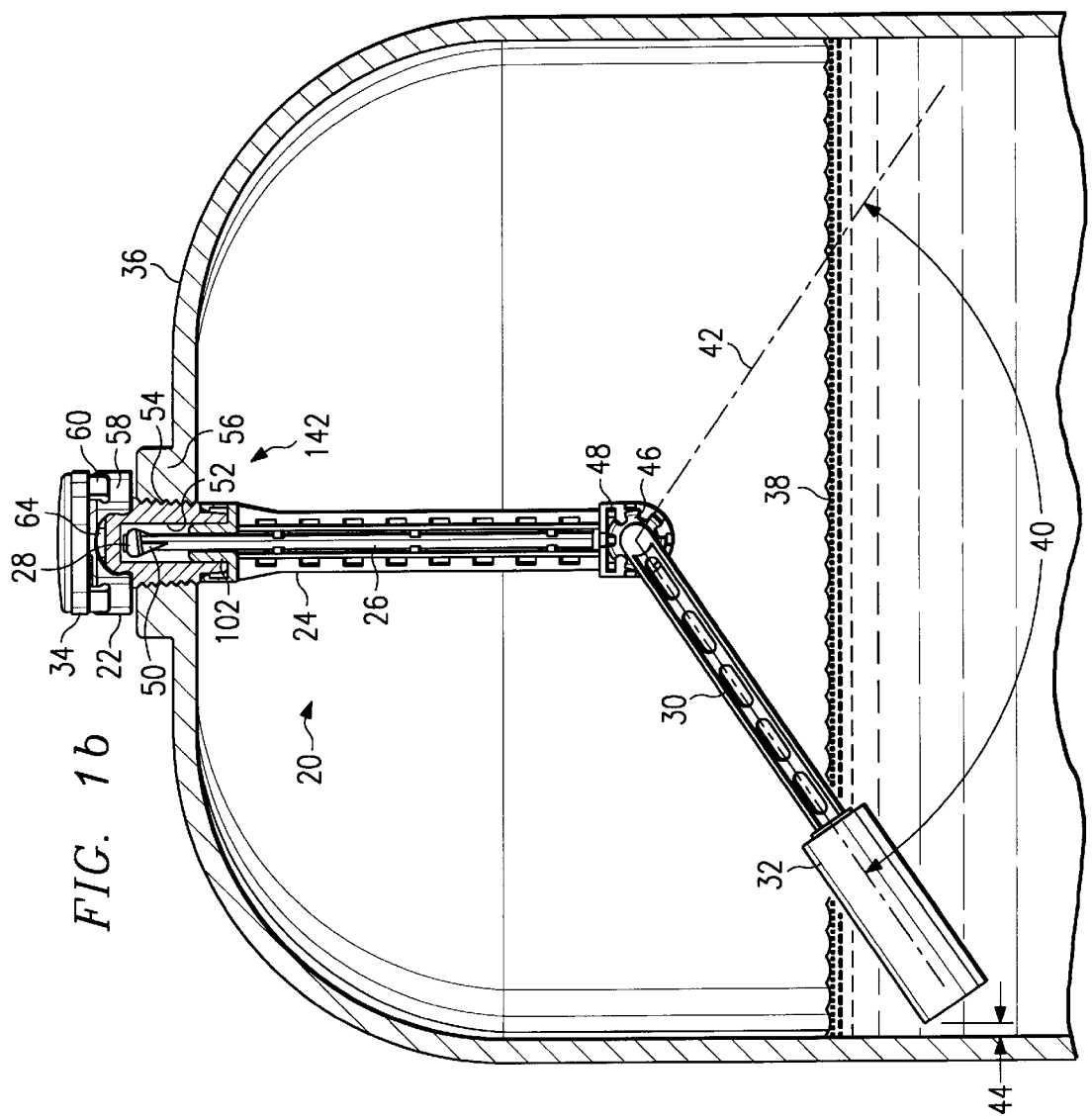
FIG. 1b is a side view of the liquid level gauge of FIG. 1a installed in a vertically oriented tank having a high level of liquid therewithin. A portion of the gauge head is broken away to show the internal components.

Referring now to FIG. 1b, liquid level gauge 20 is shown installed in a vertically oriented tank 36 containing a liquid 38 to be measured. When partially submerged in the liquid 38, float 32 is supported by the buoyant force of the liquid. As the level of the liquid 38 within tank 36 changes, the float 32 and the float arm 30 can move through an arc (indicating by reference numeral 40) between the positions shown in FIG. 1b and the alternate position shown by the dashed line designated by reference numeral 42. Gauge 20 incorporates an internal float stop which ensures that the arc of movement is such that a clearance distance (indicated by reference numeral 44) is always maintained between the float 32 and the inside surface of the tank 36 to avoid the possibility that the float 32 might become jammed or wedged against the tank side.

When a change in the level of liquid 38 causes the float 32 and the float arm 30 to move along arc 40, a float arm gear 46 which moves with the float arm 30 imparts rotary motion to a shaft gear 48, which moves with drive shaft 26. In this preferred embodiment, the float arm gear 46 is formed integrally with the float arm 30 and the shaft gear 48 is formed integrally with the drive shaft 26, however either or both of these parts may be formed separately and connected to its respective partner by means known in the art.

Referring still to FIG. 1b, rotation of the drive shaft 26 causes corresponding motion of the magnet 28 which is fixed to the upper end of draft shaft 26 by a magnet holder 50. In this preferred embodiment, the magnet holder 50 is formed integrally with the drive shaft 26, although the holder 50 could be formed separately and attached to drive shaft 26 using known means. Also in this preferred embodiment, magnet holder 50 is adapted to hold magnets having a cylindrical configuration, since magnets of this type can be economically produced through batch magnetization. The upper end of the drive shaft 26 having the magnet holder 50 and the magnet 28 extends into a tubular passage 52 formed in the gauge head 22. The gauge head 22 has a unitary non-magnetic body which is externally threaded along its lower end portion 54 for attachment to tank fitting 56. Indicating dial assembly 34 is installed on the upper portion 58 of gauge head 22. In the preferred embodiment, dial assembly 34 is secured to gauge head 22 using snap-on feet 60 which interfit with recesses 62 formed in the gauge head 22, however other embodiments (not shown) can use alternative fastening means known in the art, such as screws, without departing from the scope of the invention. The indicating dial assembly 34 has a receiving magnet 64 positioned on its underside and connected to the pointer 35 as is known in the art. When the magnet 28 is turned by the drive shaft 26, its magnetic field obviously is similarly turned, causing a corresponding movement of the receiving magnet 64 and the pointer 35 to indicate the level of liquid in the tank.

Figure 2A:
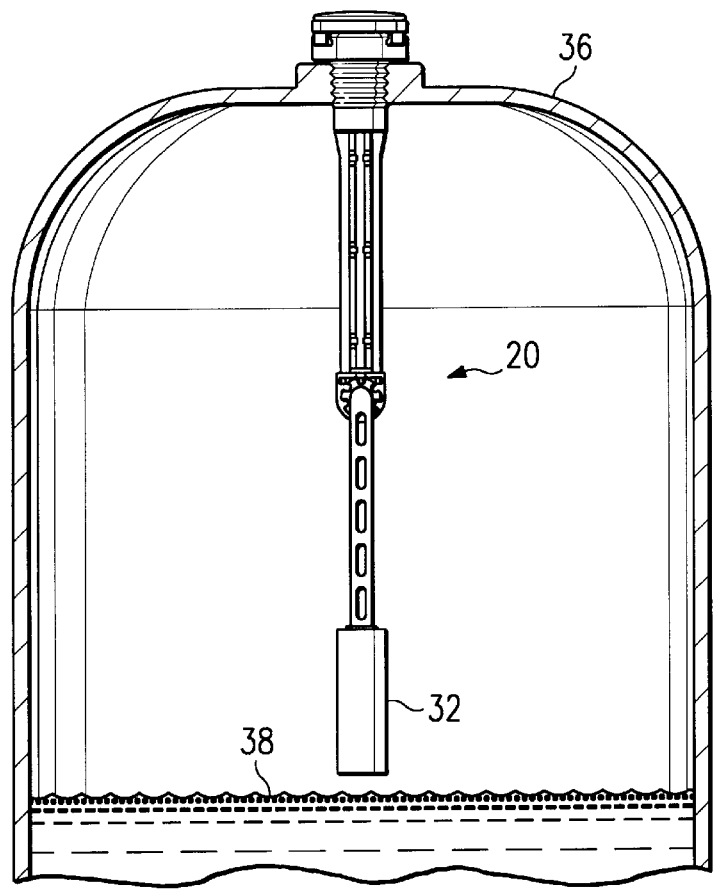
FIG. 2a is a side view of the liquid level gauge installed in a vertically oriented tank, similar to FIG. 1b, wherein the tank has a low level of liquid therewithin.
Figure 2B:
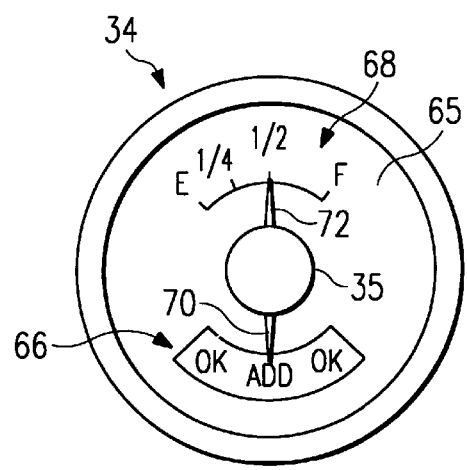

In the preferred embodiment, indicating dial assembly 34 is adapted for use in both vertically oriented and horizontally oriented tanks by means of dual indicating ranges. Referring now to FIG. 1c, the indicating dial assembly 34 for the gauge in FIG. 1b is shown with the pointer 35 oriented in the position corresponding to the liquid level and float arm position shown in FIG. 1b. The indicator dial assembly 34 has an indica plate 65 marked with a vertical indicator range 66 provided for use when the tank is in a vertically oriented position and a horizontal indicating range 68 provided for use when the tank is in a horizontally oriented position. Pointer 35 has a vertical pointer arm 70 and a horizontal pointer arm 72 indicating the measured level on their respective ranges. For example, since tank 36 shown in FIG. 1b is vertically oriented, then the vertical indicating range 66 and the vertical pointer arm 70 may be used to ascertain the satisfactory level of liquid in the tank (denoted by the indicator "OK"). Referring now to FIGS. 2a and 2b, gauge 20 is shown installed in a vertically oriented tank in which the level of liquid 38 is below the position of the float 32. Using the vertical indicating range 66 and vertical pointing arm 70, as shown in FIG. 2b, it can be ascertained that additional liquid can be added to the tank (denoted by indication the "ADD").

Figure 3A:
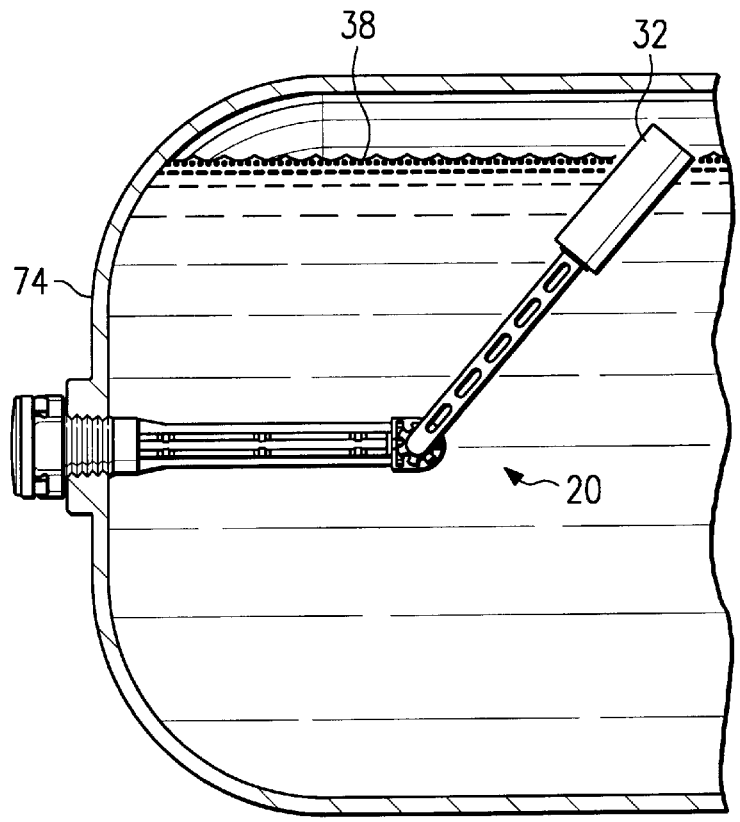
FIG. 3a is the side view of the liquid level gauge installed in a horizontally oriented tank, wherein the tank has a high level of liquid therewithin.
Figure 3B:
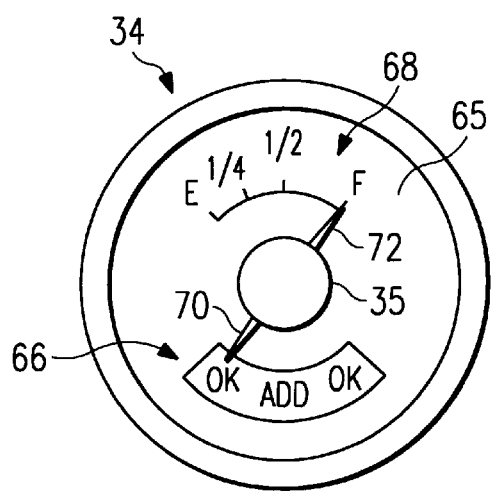
Figure 4A:
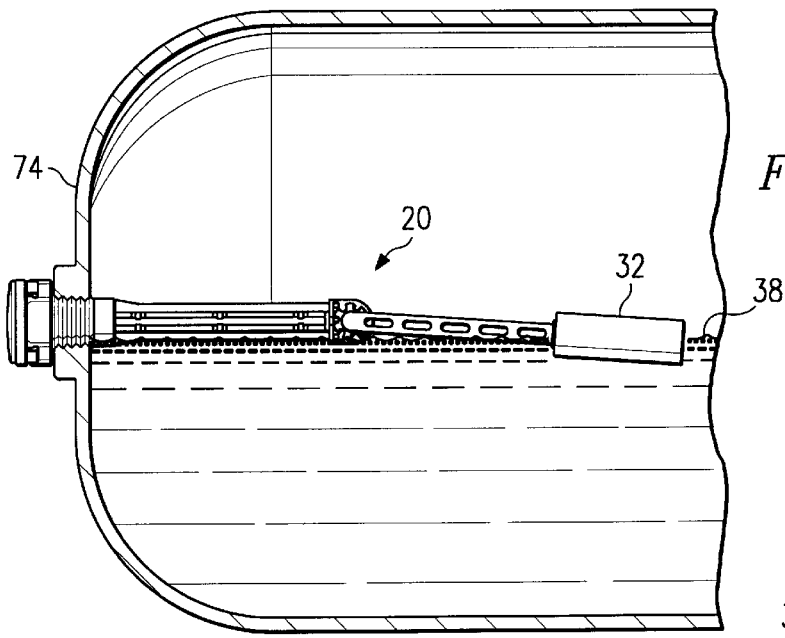
FIG. 4a is a side view of the liquid level gauge installed in a horizontally oriented cylinder, similar to FIG. 3a, wherein the tank is approximately one-half filled with liquid.
Figure 4B:
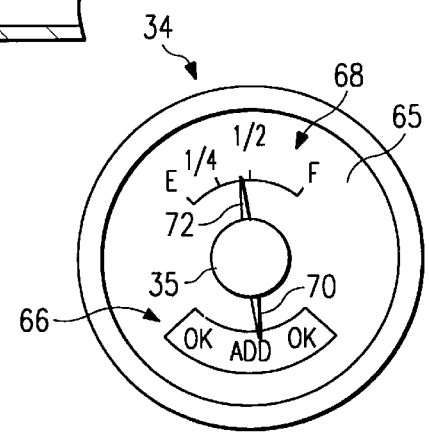
Figure 5A:
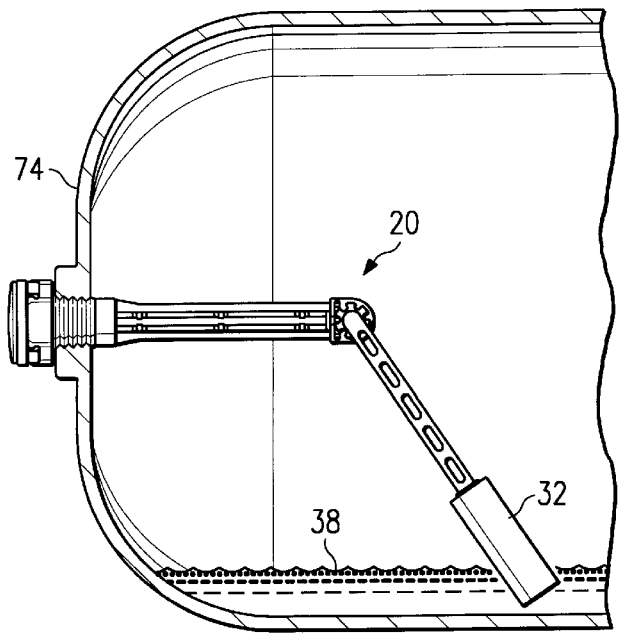
FIG. 5a is a side view of the liquid level gauge installed in a horizontally oriented tank wherein the tank has a low level of liquid therewithin.
Figure 5B:
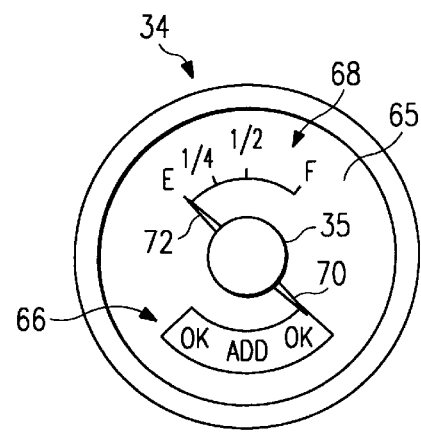

Referring now to FIGS. 3a, 4a, and 5a, a liquid level gauge 20 is shown installed in a horizontally oriented tank 74 having, respectively, full, one-half full, and empty level of liquid 38 therein. FIGS. 3b, 4b, and 5b, respectively, show indicating dial assembly 34 with pointer 35 being oriented to correspond with the positions of the float arm 30 shown in FIGS. 3a, 4a, and 5a. Since the tank is now oriented horizontally, the horizontal indicating range 68 and horizontal pointing arm 72 are used to determine the appropriate liquid level in each tank (denoted by "F", "½", "E", respectively). It will be readily apparent that other indicia could be utilized on the indicator dial to display the level of liquid in the tank without departing from the scope of the current invention.

Figure 9:
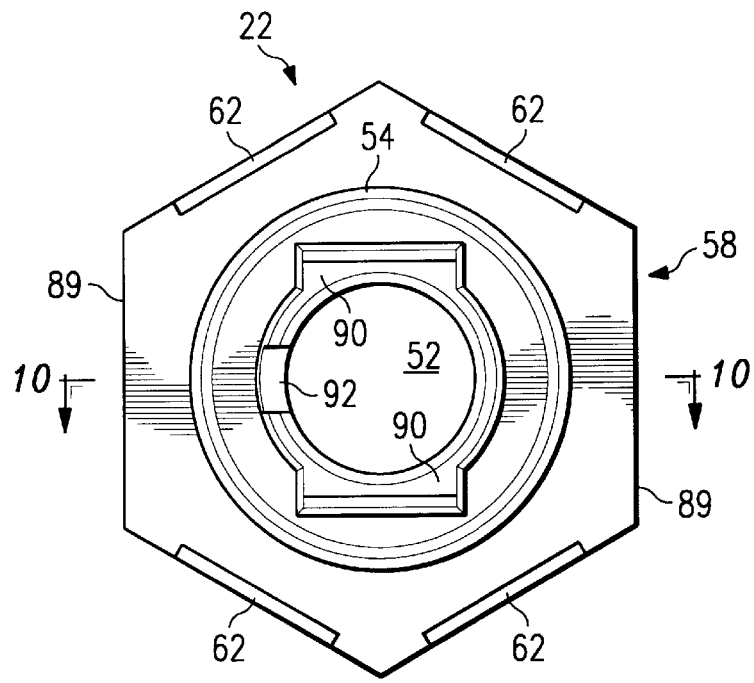
FIG. 9 is a bottom view of the gauge head of FIG. 8.

In the liquid level gauge of the current invention, a number of specially adapted components are combined in a new and unique way to provide a liquid level gauge with low parts count, ease of manufacture, and ease of assembly. For example, referring to FIGS. 8 through 10, a preferred embodiment of a gauge head 22 for the current invention is shown. The gauge head 22 mounts the gauge in an opening formed in the tank whose liquid level is to be measured while preventing the escape of volatile liquids or vapors from within the tank. In the embodiment shown, the gauge head 22 has a one piece non-magnetic body which is externally threaded along its lower end portion 54 for attachment to a tank fitting 56 (FIG. 1b). In the preferred embodiment, the gauge head 22 is made of zinc; however, other non-magnetic materials, such as brass, aluminum, or plastic could be used, depending upon the expected pressures within the tank and the type of liquid material being measured. In addition, while the preferred embodiment uses screw threads for attachment to the tank fitting, it will be readily apparent that bolted flanges or other pressure-tight attachment methods known in the art could be used without departing from the scope of the current invention.

Figure 10:
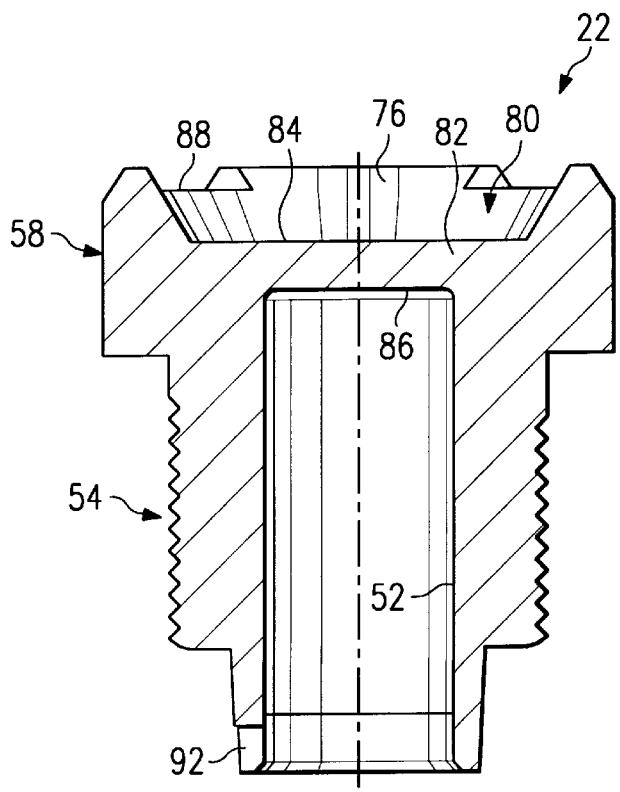
FIG. 10 is a cross-sectional view of the gauge head taken along line 10—10 of FIG. 9.

To facilitate ease of assembly, the gauge head 22 of the preferred embodiment is designed to accept a snap-on indicator dial assembly 34 such as that shown in FIGS. 6 and 7. Dial assembly 34 has a pointer 35 and indicia plate 65 as previously described, both of which are typically sealed inside a non-metallic case or shell 67 and visible through a clear lens 69. Downward projecting feet 60 on the indicator dial assembly 34 snap into recesses 62 (FIG. 8) formed in the upper portion of the gauge head, retaining the indicator dial 34 in the proper position. An index slot 76 (FIG. 8) formed on the upper surface of the gauge head 22 cooperates with an index key 78 (FIG. 7) formed on the lower surface of the indicator dial 34 to ensure that the indicator dial is properly oriented on the gauge head. The receiving magnet 64 (FIG. 7) is rotatably mounted inside shell 67 and positioned on the underside of the indicator dial assembly 34 so as to protrude into a recess 80 (FIG. 8) formed in the upper surface of the gauge head when dial assembly 34 is mounted on gauge head 22. The receiving magnet 64 is connected to the pointer 35 (FIG. 6) as is known in the art so that both rotate together within case 67. As best seen in FIG. 10, the gauge head 22 has a wall 82 separating the upper recess 80 from the tubular passage 52. When assembled, the receiving magnet 64 of the indicating dial 34 is proximate to upper surface 84 of the wall 82 while the magnet 28 (FIG. 1b) is proximate to lower surface 86 of the wall. Since the wall 82 is non-magnetic, the magnetic field of magnet 28 extends through the wall. The receiving magnet 64 aligns its magnetic field with that of magnet 28 and thereby can indicate, by means of attached pointer 35, the movement of magnet 28 without requiring a physical connection through wall 82. In this manner, the gauge head provides a liquid-and vapor-tight seal for the tank. In the preferred embodiment, the gauge head 22 incorporates at least one pry slot 88 formed in the upper portion of the gauge head to facilitate removal of the indicator dial assembly 34 by the use of a flatheaded screwdriver or similar tool. The preferred embodiment of gauge head 22 also includes a pair of wrench flats 89 formed on opposite sides of the upper portion 58 which allow the use of a large wrench or similar tool to install, tighten, or remove the gauge from the tank without necessitating removal of the indicator dial 34. Referring again to FIG. 7, it will be noted that the preferred embodiment of indicator gauge 34 has the snap-on legs 60 arranged so as to provide unobstructed areas, indicated by reference numerals 91, corresponding to the locations of the wrench flats 89 when the dial is installed on the gauge head. Referring once again to FIGS. 8 through 10, gauge head 22 has additional features facilitating the easy assembly of the current invention, including support arm mounting tabs 90 and a support arm index slot 92 formed on the lower end of the gauge head.

Figure 11A:
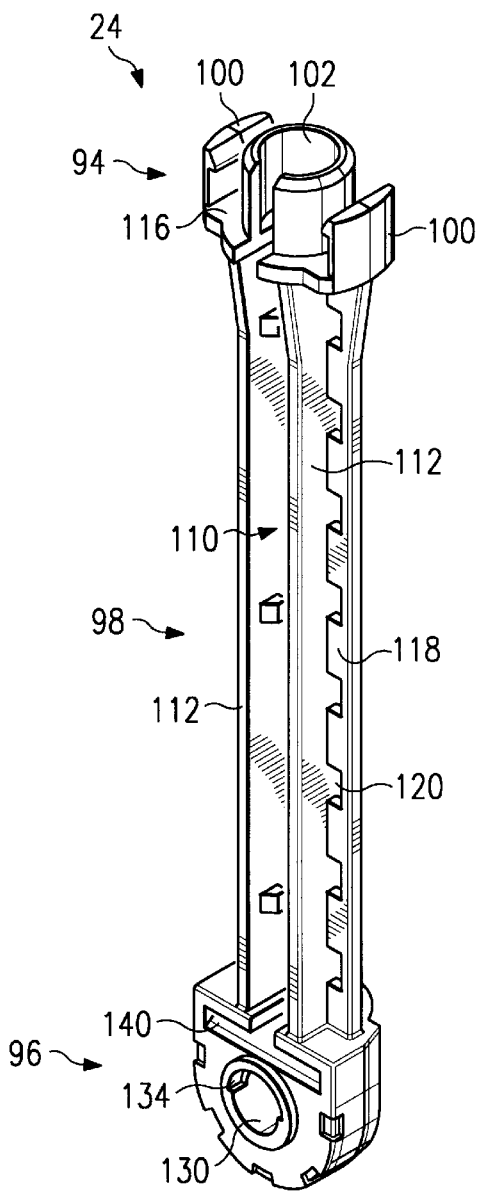
FIGS. 11a and 11b are perspective views of a preferred embodiment of the support arm of the current invention.
Figure 11B:
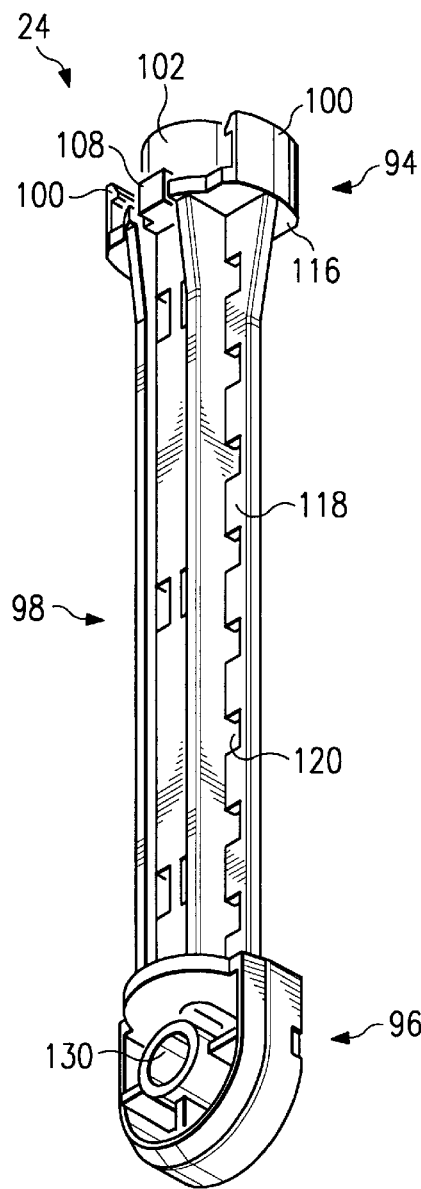
Figure 11C:
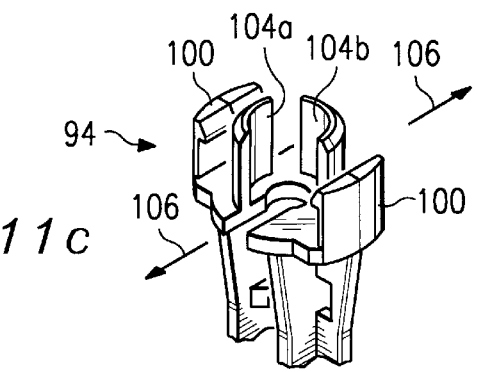
FIG. 11c is a partial perspective view, similar to FIG. 11a, of a support arm having an alternative internal head support member.

Referring now to FIG. 11a through FIG. 15, the detailed structure of the support arm 24 is shown. In the preferred embodiment shown, the support arm 24 is a one-piece assembly produced from injection molded acetal plastic. While acetal plastic is preferred for its chemical resistance, strength, and economy, other plastics, such as polyester, or other materials can be used. In addition, while a one-piece assembly is preferred, it will be apparent that multiple-piece assemblies can be used without departing from the scope of the current invention. The support arm 24 comprises an upper portion 94 for attachment to the gauge head 22, a lower portion 96 for attachment to the float arm 30, and a middle portion 98 for supporting the magnet drive shaft 26. The support arm 24 is connected to the gauge head 22 by means of at least one latching member 100. To facilitate easy attachment of the support arm 24 to the gauge head 22, in the preferred embodiment, latching member 100 is adapted to snap fit over the mounting tab 90 (FIG. 8) of the gauge head, although other attachment means known in the art could be used. To facilitate the alignment of the support arm and the gauge head, and to provide additional structural strength to the joint therebetween, a preferred embodiment of the support arm 24 also includes an internal support member 102 which is adapted to fit within tubular passage 52 (FIG. 10) of the gauge head 22. To provide maximum support, the internal support member 102 may take the form of a nearly complete cylinder as shown in FIG. 11*a*. As shown in FIG. 11*c*, however, the internal support member can also be formed from two or more partially cylindrical members 104*a* and 104*b*, which provide the desired internal support but which do not interfere with other desirable properties, such as the injection moldability of the support arm 24. If the internal support member 104*a* and 104*b* shown in FIG. 11*c* are utilized on a support arm 24 rather than the single piece internal support arm 102, then the entire support arm 24 can be formed by injection molding in a die having a single separation axis (i.e., the direction of die separation) as indicated by the dashed lines denoted by reference numerals 106 in FIG. 11*c*. To further ensure proper alignment of the support arm 24 on the gauge head 22, an alignment key 108 can be provided which interfits into the index slot 92 (FIGS. 9 and 10) in the lower portion of the gauge head.

Another feature of the support arm 24 which facilitates ease of assembly and low parts count of the current invention, is the side-accessible shaft passage 110 formed by the middle portion 98 of the support arm. The term side-accessible refers to the structure of the support arm 24 having a continuous unobstructed opening along a lateral side (that is, a side generally parallel to the longitudinal axis of the shaft passage 110) between the shaft passage 110 and the exterior allowing the drive shaft 26 to be inserted into the shaft passage 110 in a direction generally perpendicular to the longitudinal axis of both the drive shaft and the shaft passage. Prior art float gauges have heretofore used tubular support arms which required the drive shaft to be installed through the end of the support arm in a direction generally aligned with the longitudinal axes of the drive shaft and shaft passage, thus limiting the size of components which can be attached to the shaft prior to the installation and requiring separate bearings to support the shaft. The side-accessible shaft passage 110 of the current invention is a great improvement because it allows magnet drive shafts to be installed into the support arm 24 even if the drive shaft has magnet holders, gears, or other structures on the ends which are wider than the shaft passage. This is especially desirable for use with drive shafts having integral magnet holders and gears. In addition, the side-accessible shaft passage 110 allows the shaft bearings 122, 124 (FIGS. 12, 14) to be an integral part of support arm 24 rather than requiring them to be separate parts.

As best seen in FIGS. 14 and 15, in the preferred embodiment, the side-accessible shaft passage 110 is formed by the U-shaped combination of sidewalls 112 and backwall 114 that form the middle portion 98 of the support arm. In addition, a corresponding slot 115 is provided in head stop 116 and in internal support member 102 to allow the lateral insertion of the magnet drive shaft 26 (shown in place in FIG. 1*b*). In the preferred embodiment, the middle portion 98 of the support arm further comprises longitudinal support members 118 adding to the rigidity of the support arm. In the embodiment shown, the support members 118 form holes 120 to reduce material usage without significantly affecting the rigidity provided by support members 118. It will be readily apparent that other configurations for the middle portion of the support arm, including a C-shaped, V-shaped, I-shaped, or H-shaped cross-section, can be used to provide the side-accessible drive shaft passage without departing from the scope of the current invention.

To facilitate the easy assembly of the magnet drive shaft into the support arm 24, and to reduce the need for additional discrete parts, a preferred embodiment of the support arm 24 has integral shaft retainers 122 and shaft bearings 124 (best seen in FIGS. 12 and 14) formed on the side walls 112 and back wall 114. When the magnet drive shaft (not shown) is inserted into the side-accessible shaft passage 110, the side walls 112 flex in the directions shown by the arrows denoted by reference numeral 128, allowing the drive shaft to pass between the shaft retainers 122 and into the position shown in phantom and denoted by reference numeral 126, i.e., positioned between the shaft retainers 122 and the shaft bearing 124. Once in the position denoted by reference numeral 126, the drive shaft is securely retained in the support arm 24 yet free to rotate or to move longitudinally (if not otherwise restrained by other components).

Referring still to FIGS. 11*a* through 15, the lower end 96 of the support arm 24 is adapted for pivotal connection to the float arm 30 (FIG. 17*a*). In a preferred embodiment, the lower end 96 forms a passage 130 for receiving a pivot pin 132 (FIGS. 17*a* and 17*b*) of the float arm 30; however, it is apparent that the relative locations of the pin 132 and passage 130 on the support arm 24 and float arm 30 can be reversed. To prevent the float 32 from touching the sides of the cylinder, an internal float stop is provided on the float arm 30 and the support arm 24 to limit the range of motion of the float arm. The float stop is considered internal where its components are not exposed on the outside surface of the gauge. This minimizes the possibility that the float stop mechanism will be contaminated by any debris within the cylinder. In a preferred embodiment, the internal float stop comprises a keyway 134 (FIG. 12) that is formed on support arm 24 in an arc surrounding passage 130 to interfit with a key 136 (FIGS. 17*a* and 17*b*) formed on the float arm 30. The key 136 and keyway 134 cooperate to restrict the range of motion of the float arm 30 to the arc denoted by reference numeral 138 in FIG. 12. Float gear 46 completely covers the float stop components 134, 136 in the assembled gauge, thus making the float stop internal. In this preferred embodiment, the lower end 96 also forms a shaft gear passage 140 to accommodate the shaft gear 48 (FIGS. 16*a* and 16*b*) when the magnet drive shaft 26 is installed in the shaft passage.

Referring now to FIGS. 16*a* and 16*b*, the magnet drive shaft 26 has an upper end 142 having a magnet holder 50 and a lower end 144 having a shaft gear 48. In the preferred embodiment, the drive shaft 26 is a one-piece assembly produced from injection-molded acetal plastic, but like other components previously described, it will be apparent that other materials or multiple-piece assemblies can also be used. The magnet holder 50 is adapted for the snap-fit attachment of a cylindrical magnet 28 as shown in FIG. 16*b*. The cylindrical magnet has its magnetic poles at the flat ends of the cylinder. Cylindrical magnets of this type are inexpensive to produce because they can be manufactured through batch magnetization. In addition, the magnetic flux field of the cylindrical magnet 28 is automatically aligned with respect to the magnet holder 50, thus further simplifying assembly of the gauge. In the preferred embodiment, which has an indicator dial assembly 34 having a pointer 35 with double arms 70, 72, the orientation of the North and South poles of magnet 28 within magnet holder 50 is completely irrelevant to proper operation of the gauge. While use of a cylindrical magnet is preferred, however, it will be readily apparent that bar, disk, horseshoe, or other such magnets could be used if they are properly aligned on the magnet drive shaft.

When manufactured of a resilient material, the magnet holder 50 of the preferred embodiment will flex to allow the snap-fit attachment of the magnet. In addition, this magnet holder can be molded as an integral piece of the magnet drive shaft, thereby insuring alignment of the magnet 28 with respect to the drive shaft gear 48, lowering the number of discrete components forming the level gauge and simplifying assembly. The magnet holder 50 shown in the preferred embodiment can be injection molded in a die having a single separation axis.

As best seen in FIG. 1*b*, in the assembled liquid level gauge, the upper end 142 of drive shaft 26 extends beyond the upper end of the support arm 24 and into the tubular passage 52 of the gauge head 22, thereby engaging the magnetic field of the receiver magnet 64 with the magnet field of magnet 28 to indicate the position of the float arm. The drive shaft gear 48 is formed at the lower end 144 of the drive shaft 26 and adapted to fit through shaft gear passage 140 (FIG. 12) at the bottom end of the support arm 24. A plurality of gear teeth 146 are formed on shaft gear 48 for engaging the float arm gear 46 (FIGS. 17*a* and 17*b*). A boss 147 (FIG. 16*a*) can be formed on the drive shaft 26 which interfits with a groove feature 141 (FIG. 12) the shaft passage 110 to prevent longitudinal motion of the shaft. A positioning notch 148 or other such indicia can be provided on one of the gear teeth 146 to provide an indication of the orientation of the magnet holder 50 at the other end, thereby facilitating proper orientation of the components during assembly.

Referring now to FIG. 17*a*, a preferred embodiment of the float arm 30 is shown. In this embodiment, the float arm is a single-piece assembly produced from injection-molded acetal plastic, however, other materials and a multiple-piece assembly could also be used. The float arm 30 is pivotally connected to the support arm 24 by the pivot pin 132 which passes through the passage 130 (FIGS. 11*a* through 13). In the preferred embodiment shown in FIG. 17*a*, pivot pin 132 is retained in the passage 130 by a flanged fastener 150 which is pressed into a passage 152 formed in the end of pivot pin 132. In an alternative embodiment, as shown in FIG. 17*b*, pivot pin 132 is retained in passage 130 by an integral snap fastener 154 molded on the end of pivot pin 132. The use of an integral snap fastener will decrease the parts count and improve the ease of assembly. As previously described, a float arm gear 46 is provided at the upper end 149 of the float arm 30 to engage the drive shaft gear 48 (FIGS. 16*a* and 16*b*). In the preferred embodiment, float arm gear 46 is an integral part of the float arm 30, thereby reducing the number of parts of the gauge and simplifying assembly. It will be readily apparent, however, that the float arm gear 46 could be provided as a separate component. At the lower end 156 of the float arm, an attachment member 158 is provided for attachment of the float 32. In the preferred embodiment shown in FIG. 17*a*, the attachment member 158 comprises an array of barbs which can be pushed into a matching hole 160 (FIG. 18) formed in float 32; however, other attachment means known in the art could be used. Due to the low density of LPG liquids and the relatively low buoyant forces that they produce, it is preferred that the middle portion 162 of the float arm 30 have the lightest possible structure. In the preferred embodiment, the middle portion 162 is formed from a molded plastic material having an I-beam cross-section for rigidity and having lightening holes 164 formed in the center web 166. The preferred embodiment of the float arm 30 shown in FIG. 17*a* can be conveniently produced as single piece injection molding utilizing a die having a single separation axis in the direction indicated by the dashed arrows denoted by reference number 168.

Referring now to FIG. 18, the float 32 provides buoyancy to the float arm through the displacement of the liquid being measured. The float should be as light as possible yet able to withstand the pressure within the tank. Hollow metal or non-metallic floats such as those used in previous liquid level gauges may be used; however, hollow floats are expensive to fabricate and prone to leakage. It is therefore preferred to use a solid float 32 comprising a core 170 formed of pressure-resistant closed cell foam enclosed in a wear resistant outer covering or shell 172. In the preferred embodiment, the float 32 is formed of nitrile ebonite, a form of nitrile rubber. This material is especially well suited for such floats because it forms an integral shell 172 where the foam material of the core 170 touches the walls of the molding cavity. Thus, both the core 170 and the shell 172 of the float 32 can be formed of nitrile ebonite in a single operation. A float 32 of this type can be easily attached to the float arm 30 by pushing the attachment member 158 (FIG. 17*a*) into the mounting hole 160 provided in the float.

Referring now to FIG. 19, in an alternative embodiment, the separate float arm 30 and float 32 can be replaced with a one-piece float-and-arm member 174 having an integral arm portion 176 and an integral float portion 178. The arm portion 176 may further have a float arm gear 46 formed thereon as another integral piece. Depending upon the material used to form the float-and-arm member 174, the float portion 178 may have less buoyancy than a separately molded float, such as float 32 made with closed cell foam. Therefore, float-and-arm member 174 can have an integral counterweight member 182 formed on the opposite side of pivot point 180 from arm portion 176 and float portion 178. To facilitate easy insertion of the float gauge into the tank, the counterweight 182 can be rod shaped so that the counterweight can lay parallel to the support arm 24 during insertion into the tank. If additional counterweight is required, a mass 184 (shown in phantom) can be formed on the counterweight 182 while still allowing easy insertion of the float-and-arm member 174 into the tank. In a preferred embodiment, the float-and-arm member 174, including any counterweights, will be constructed as a one-piece assembly, such as by injection molding of plastic or other materials.

A liquid level gauge according to the current invention provides a gauge having a very low parts count, and which can be assembled without the use of specialized tools or equipment. For example, if the magnetically coupled indicator dial assembly is considered a single component, the preferred embodiment of the liquid level gauge 20 can be constructed of only eight discrete components as follows: a magnet (FIG. 16*b*); a one-piece magnet drive shaft (FIGS. 16*a* and 16*b*); a one-piece support arm (FIGS. 11*a* through 15); a one-piece gauge head (FIGS. 8 through 10); a one-piece float-arm (FIG. 17*a*); a fastener (FIG. 17*a*); a float (FIG. 18), and a magnetically coupled indicator dial assembly (FIGS. 6 and 7). Assembling the gauge 22 requires only the following steps: Place magnet 28 into magnet holder 50 of drive shaft 26; push drive shaft 26 laterally into side-accessible passage 110 of support arm 24 with integral shaft gear 48 positioned in opening 140; insert upper end 142 of drive shaft 26 into passage 52 of gauge head 22 while pushing upper end 94 of support arm 24 onto gauge head 22; insert pivot pin 132 of float arm 30 through passage 130 of support arm 24 while engaging float gear 48 with shaft gear 46; insert flanged fastener 150 into passage 152 in pivot pin 132; push float 32 onto attachment number 158 of float arm 30; and snap feet 60 of indicator dial assembly 34 into recesses 62 of gauge head 22. It will be readily appreciated that the order of these steps may be rearranged without departing from the scope of the current invention.

In an alternative embodiment, a liquid level according to the current invention can be constructed from only six discrete components as follows: a magnet (FIG. 16b); a one-piece drive shaft (FIGS. 16a and 16b); a one-piece support arm (FIGS. 11a through 15); a one-piece gauge head (FIGS. 8 through 10); a one-piece float-and-arm member (FIG. 19) having an integral snap fastener (FIG. 17b), and a magnetically coupled indicator dial assembly (FIGS. 6 and 7). Assembling this gauge 22 requires only the following steps: Place magnet 28 into magnet holder 50 of drive shaft 26; push drive shaft 26 laterally into side-accessible passage 110 of support arm 24 with integral shaft gear 48 positioned in opening 140; insert upper end 142 of drive shaft 26 into passage 52 of gauge head 22 while pushing upper end 94 of support arm 24 onto gauge head 22; insert pivot pin 132 of float-and-arm member 174 through passage 130 of support arm 24 while engaging float gear 48 with shaft gear 46; and snap feet 60 of indicator dial assembly 34 into recesses 62 of gauge head 22. As with the previously described embodiment, the order of these steps may be re-arranged.

Many of the components of the current invention, such as the one-piece magnet drive shaft 26, the one-piece support arm 24, and one-piece float arm 30 can be constructed from injection molded plastics or similar materials. The one-piece gauge head 22 can be made of die cast or machined metal or of injection molded plastic depending on the material required. The unique design of the current invention allows such one-piece components, which can be efficiently manufactured using automated methods, to replace numerous discrete components which were produced by machining, stamping and other complex fabrication methods. In addition, the components of the current invention can be assembled without specialized equipment. This results in a great cost savings to the gauge manufacturer while providing the gauge user with a simple, reliable, and attractive liquid level gauge.

In another aspect of the current invention, a liquid level gauge sub-assembly is provided for use with a user-supplied magnetically coupled sensor. In this embodiment, the gauge sub-assembly would comprise a gauge head 22, support arm 24, shaft 26, magnet 28, float arm 30 and float 32. An indicator dial assembly is not provided, instead gauge head 22 is adapted for connection to a user-supplied magnetically coupled sensor. Such sensors are well-known in the art and may provide either a visual indication of level, or an electrical resistance or voltage relating to the liquid level, or both. In all other respects, operation of this liquid level gauge sub-assembly and the components of which it is comprised, are identical to the embodiments of the liquid level gauge previously described.

Thus, there is disclosed a float-type liquid level gauge that overcomes the shortcomings and disadvantages of the prior art liquid level gauges. While the foregoing embodiments of the invention have been disclosed with reference to a specific gauge structure, it is to be understood that many changes in detail may be made as a matter of design choices, without departing from the spirit and scope of the invention, as defined by the appended claims.

I claim:

1. A liquid level gauge comprising:
   a) a gauge head having a lower portion defining a passage formed on its lower surface and a dial assembly mounting portion formed on its upper surface;
   b) a support arm having an upper end connected to said lower portion of said gauge head, a float arm attachment portion being located at a distance from said upper end, and a middle portion extending between said upper end and float arm attachment portion;
   said middle portion defining a side-accessible shaft passage extending between said upper end and said float arm attachment portion;
   c) a magnet drive shaft rotatably mounted in said shaft passage and having a magnet holder located at an upper end and a shaft gear located at a distance from said upper end;
   said upper end of said shaft extending beyond said upper end of said support arm and positioning said magnet holder within said passage of said gauge head;
   d) a magnet being secured to said magnet holder of said magnet drive shaft;
   e) a float arm having a first portion being pivotally connected to said float arm attachment portion of said support arm, having a float arm gear located on said first portion, and having a float attachment member being formed at a distance from said first portion;
   said float arm gear engaging said shaft gear to impart rotational motion to said shaft, said magnet holder and said magnet relative to said support arm and said gauge head upon rotation of said float arm relative to said support arm;
   f) a float being attached to said float attachment member of said float arm;
   g) said support arm further comprising at least one shaft retainer;
   each said shaft retainer having opposing members formed integrally with said middle portion of said support arm to define a gap between said opposing members;
   said gap having a width thereacross when no force is applied against said opposing members which is less than the diameter of the portion of the magnet drive shaft adjacent said opposing members; and
   h) an indicating dial assembly mounted on said gauge head, said dial assembly including a receiving magnet rotatably mounted within a non-magnetic shell and connected to a visible pointer.

2. A liquid level gauge according to claim 1, further comprising an internal float stop having a first portion formed integrally with said float arm and having a second portion formed integrally with said support arm.

3. A liquid level gauge according to claim 2, wherein said second portion of said internal float stop comprises a keyway formed on said support arm and said first portion of said internal float stop comprises a key formed on said float arm, both of said key and keyway being completely covered by a portion of said float arm, said key interfitting within said keyway to define a range of angular motion for said float arm with respect to said support arm.

4. A liquid level gauge according to claim 1, wherein said magnet drive shaft is molded as part of a single piece including said magnet holder and said shaft gear.

5. A liquid level gauge according to claim 4, wherein said magnet drive shaft is formed of acetal plastic.

6. A liquid level gauge according to claim 1, wherein said support arm is molded as a single piece.

7. A liquid level gauge according to claim 6, wherein said support arm further comprises an integral head support member disposed within said passage of said head.

8. A liquid level gauge according to claim 1, wherein said float arm is molded as part of a single piece including said float gear.

9. A liquid level gauge according to claim 8, wherein said float arm is formed of acetal plastic.

10. A liquid level gauge according to claim 2, wherein said second portion of said internal float stop comprises a key formed on said support arm and said first portion of said internal float stop comprises a keyway formed on said float arm, both of said key and keyway being completely covered by a portion of said float arm, said key interfitting within said keyway to define a range of angular motion for said float arm with respect to said support arm.

11. A liquid level gauge comprising:

a) a gauge head having a lower portion defining a passage formed on its lower surface and a dial assembly mounting portion formed on its upper surface;

b) a support arm having an upper end connected to said lower portion of said gauge head, a float arm attachment portion being located at a distance from said upper end, and a middle portion extending between said upper end and said float arm attachment portion; said middle portion defining a side-accessible shaft passage extending between said upper end and said float arm attachment portion;

c) a magnet drive shaft rotatably mounted in said shaft passage and having a magnet holder located at an upper end and a shaft gear located at a distance from said upper end;

said upper end of said shaft extending beyond said upper end of said support arm and positioning said magnet holder within said passage of said gauge head;

d) a magnet being secured to said magnet holder of said magnet drive shaft;

e) a float arm having a first portion being pivotally connected to said float arm attachment portion of said support arm, having a float arm gear located on said first portion, and having a float attachment member being formed at a distance from said first portion;

said float arm gear engaging said shaft gear to impart rotational motion to said shaft, said magnet holder and said magnet relative to said support arm and said gauge head upon rotation of said float arm relative to said support arm;

f) a float being attached to said float attachment member of said float arm;

g) said magnet holder of said magnet drive shaft further comprising a resilient member which is deformed during insertion of said magnet into said magnet holder and which thereafter biases said magnet against said magnet holder, thereby securing said magnet to said magnet holder; and h) an indicating dial assembly mounted on said gauge head, said dial assembly including a receiving magnet rotatably mounted within a non-magnetic shell and connected to a visible pointer.

12. A liquid level gauge according to claim 11, wherein said magnet has a flux field axis, and wherein insertion of said magnet into said magnet holder predictably aligns said flux field axis with respect to said magnet holder.

13. A liquid level gauge according to claim 11, further comprising an internal float stop having a first portion formed integrally with said float arm and having a second portion formed integrally with said support arm.

14. A liquid level gauge according to claim 13, wherein said second portion of said internal float stop comprises a keyway formed on said support arm and said first portion of said internal float stop comprises a key formed on said float arm, both of said key and keyway being completely covered by a portion of said float arm, said key interfitting within said keyway to define a range of angular motion for said float arm with respect to said support arm.

15. A liquid level gauge according to claim 13, wherein said second portion of said internal float stop comprises a key formed on said support arm and said first portion of said internal float stop comprises a keyway formed on said float arm, both of said key and keyway being completely covered by a portion of said float arm, said key interfitting within said keyway to define a range of angular motion for said float arm with respect to said support arm.

16. A liquid level gauge sub-assembly for use with a magnetically driven indicating dial assembly, said gauge sub-assembly comprising:

a) a gauge head having a lower portion defining a passage formed on its lower surface and a dial assembly receiving portion formed on its upper surface;

b) a one-piece support arm having an upper end connected to said lower portion of said gauge head, an integral float arm attachment portion being formed at a distance from said upper end, and a middle portion extending between said upper end and said float arm attachment portion;

said upper end including an integral head supporting member disposed within said passage of said gauge head;

said float arm attachment portion including one of an integral keyway and an integral key;

said middle portion defining a side-accessible shaft passage and at least one integral shaft retainer having opposing members projecting towards one another and defining a gap therebetween;

said gap having a first width thereacross when no force is applied against said retaining member;

c) a one-piece magnet drive shaft having an integral magnet holder formed at an upper end and an integral shaft gear formed at a distance from said upper end;

said shaft having, in regions proximate any said shaft retainer, a diameter greater than said first width of said gap between said opposing members of said shaft retainer;

said magnet holder being adapted to deform during insertion of a magnet into said magnet holder and thereafter biasing said magnet against said magnet holder to secure said magnet to said magnet holder;

said upper end of said magnet drive shaft extending beyond said upper end of said support arm and positioning said magnet holder within said tubular passage of said gauge head;

d) a magnet being secured to said magnet holder;

e) a one-piece float arm having a first portion pivotally connected to said float arm attachment portion of said support arm; said float arm having the other of said keyway and said key formed thereon, having an integral pivot gear formed thereon, and having an integral float attachment portion formed at a distance from said first portion;

said key being cooperatively positioned within said keyway to define a range of angular motion for said float arm with respect to said support arm;

said pivot gear engaging said shaft gear to impart rotational motion to said shaft, said magnet holder, and said magnet relative to said support arm and said head upon rotation of said float arm relative to said support arm; and f) a float attached to said float attachment portion of said float arm.

17. A liquid level gauge comprising a liquid level gauge sub-assembly according to claim 15 and a magnetically coupled indicator dial assembly mounted on said gauge head.

18. A liquid level gauge according to claim 17 wherein said support arm, said magnet drive shaft, and said float are formed of acetal plastic.

19. A liquid level gauge sub-assembly for use with a magnetically driven indicating dial assembly and a gauge head having a lower portion defining a passage formed on its lower surface, said gauge sub-assembly comprising:

a) a support arm having an upper end adapted for connection to the lower portion of a gauge head, a float arm attachment portion being located at a distance from said upper end, and a middle portion extending between said upper end and said float arm attachment portion;

said middle portion defining a side-accessible shaft passage extending between said upper end and said float arm attachment portion;

b) a magnet drive shaft rotatably mounted in said shaft passage and having a magnet holder located at an upper end and a shaft gear located at a distance from said upper end;

said upper end of said shaft extending beyond said upper end of said support arm for positioning said magnet holder within said passage of said gauge head;

c) a float arm having a first portion being pivotally connected to said float arm attachment portion of said support arm, having a float arm gear located on said first portion, and having a float attachment member being formed at a distance from said first portion;

said float arm gear engaging said shaft gear to impart rotational motion to said shaft and said magnet holder relative to said support arm and said gauge head upon rotation of said float arm relative to said support arm; and d) said support arm further comprising at least one shaft retainer;

each said shaft retainer having opposing members formed integrally with said middle portion of said support arm to define a gap between said opposing members;

said gap having a width thereacross when no force is applied against said opposing members which is less than the diameter of the portion of the magnet drive shaft adjacent said opposing members.

20. A liquid level gauge sub-assembly for use with a magnetically driven indicating dial assembly and a gauge head, said gauge sub-assembly comprising:

a) a support arm having an upper end adapted for connection a gauge head, a float arm attachment portion being located at a distance from said upper end, and a middle portion extending between said upper end and said float arm attachment portion;

said middle portion defining a side-accessible shaft passage extending between said upper end and said float arm attachment portion;

b) a magnet drive shaft rotatably mounted in said shaft passage and having a magnet holder located at an upper end and a shaft gear located at a distance from said upper end;

said magnet holder of said magnet drive shaft including a resilient member which can be deformed to allow insertion of a magnet into said magnet holder and which thereafter biases said magnet against said magnet holder, thereby securing said magnet to said magnet holder; and c) a float arm having a first portion being pivotally connected to said float arm attachment portion of said support arm, having a float arm gear located on said first portion, and having a float attachment member being formed at a distance from said first portion;

said float arm gear engaging said shaft gear to impart rotational motion to said shaft and said magnet holder relative to said support arm and said gauge head upon rotation of said float arm relative to said support arm.

21. A liquid level gauge sub-assembly according to claim 20, wherein insertion of a magnet having a flux field axis into said magnet holder predictably aligns said flux field axis with respect to said magnet holder.

* * * * *

UNITED STATES PATENT AND TRADEMARK OFFICE
CERTIFICATE OF CORRECTION

PATENT NO. : 6,041,650 Page 1 of 1
DATED : March 28, 2000
INVENTOR(S) : Danny E. Swindler et al.

It is certified that error appears in the above-identified patent and that said Letters Patent is hereby corrected as shown below:

Column 15:
Line 2 (claim 17, line 2), delete "15", and insert --16--.

Signed and Sealed this

Twelfth Day of June, 2001

*Attest:*

NICHOLAS P. GODICI
*Attesting Officer*     *Acting Director of the United States Patent and Trademark Office*